United States Patent
Song et al.

(10) Patent No.: US 8,130,878 B2
(45) Date of Patent: Mar. 6, 2012

(54) APPARATUS AND METHOD FOR ESTIMATING CARRIER-TO-INTERFERENCE-AND-NOISE RATIO IN AN ORTHOGONAL FREQUENCY DIVISION MULTIPLEXING SYSTEM

(75) Inventors: Seong-Wook Song, Gwacheon-si (KR); Jae-Hwan Chang, Suwon-si (KR); Young-Mo Gu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1055 days.

(21) Appl. No.: 11/393,000

(22) Filed: Mar. 30, 2006

(65) Prior Publication Data

US 2006/0256885 A1 Nov. 16, 2006

(30) Foreign Application Priority Data

Mar. 30, 2005 (KR) .................. 10-2005-0026830

(51) Int. Cl.
*H03D 1/04* (2006.01)
*H04L 25/08* (2006.01)

(52) U.S. Cl. ........ 375/346; 375/285; 375/148; 375/254; 375/278; 375/284

(58) Field of Classification Search .................. 375/224, 375/225, 227, 260, 350
See application file for complete search history.

(56) References Cited

U.S. PATENT DOCUMENTS

| | | | |
|---|---|---|---|
| 5,257,283 A * | 10/1993 | Gilhousen et al. | 455/522 |
| 6,215,827 B1 | 4/2001 | Balachandran et al. | |
| 7,012,912 B2 * | 3/2006 | Naguib et al. | 370/343 |
| 7,023,981 B2 * | 4/2006 | Stephens et al. | 379/386 |
| 7,146,103 B2 * | 12/2006 | Yee et al. | 398/68 |
| 2006/0072513 A1 * | 4/2006 | Kent et al. | 370/335 |
| 2006/0251024 A1 * | 11/2006 | Wang | 370/333 |

FOREIGN PATENT DOCUMENTS

| | | |
|---|---|---|
| KR | 1019970063981 | 9/1997 |
| KR | 1020030016751 A | 3/2003 |
| KR | 1020040110342 | 12/2004 |

* cited by examiner

*Primary Examiner* — Khanh C Tran
*Assistant Examiner* — Qutbuddin Ghulamali
(74) *Attorney, Agent, or Firm* — Roylance, Abrams, Berdo & Goodman, LLP

(57) ABSTRACT

An apparatus and method for estimating a carrier-to-interference-and-noise ratio (CINR) of a received signal in an orthogonal frequency division multiplexing (OFDM) system are provided. A band-pass filter attenuates a signal region of the received signal and passes a signal in a noise region. A first power calculator calculates interference and noise power of the noise-region signal received from the band-pass filter. A second power calculator calculates total received power of the received signal. A ratio calculator calculates a CINR based on the interference and noise power, and the total received power.

6 Claims, 9 Drawing Sheets

APPARATUS AND METHOD FOR ESTIMATING CARRIER-TO-INTERFERENCE-AND-NOISE RATIO IN AN ORTHOGONAL FREQUENCY DIVISION MULTIPLEXING SYSTEM

PRIORITY

This application claims the benefit under 35 U.S.C. §119(a) of a Korean Patent Application filed in the Korean Intellectual Property Office on Mar. 30, 2005 and assigned Serial No. 2005-26830, the entire disclosure of which is hereby incorporated by reference.

BACKGROUND OF THE INVENTION

1. Field of the Invention

The present invention relates generally to an apparatus and method for estimating a Carrier-to-Interference-and-Noise Ratio (CINR) in a wireless communication system. More particularly, the present invention relates to an apparatus and method for estimating a CINR in an Orthogonal Frequency Division Multiplexing (OFDM)/Orthogonal Frequency Division Multiple Access (OFDMA) wireless communication system.

2. Description of the Related Art

Wireless communication systems have been developed to transmit radio signals to allow terminals to perform communication any place. The typical wireless communication system includes a Code Division Multiple Access (CDMA) cellular mobile communication system. The CDMA cellular mobile communication system fundamentally provides voice service and can additionally provide data service. However, with the rapid development of communication technology, the data service, compared with the voice service, is increasing in importance in the CDMA cellular mobile communication system. Due to the increase importance of the data service in the CDMA cellular mobile communication system, users and service providers desire to transmit a larger amount of data at a higher rate. However, the CDMA cellular mobile communication system is considered to have reached its limit in providing higher-speed data service due to limited resources.

To address the problems caused by the limited resources of the CDMA cellular mobile communication system, live discussions have occurred on standardization for the OFDM/OFDMA wireless communication systems, and commercialization thereof. The OFDM/OFDMA wireless communication system can transmit data at a high rate using a plurality of orthogonal sub-carriers. Herein, both the OFDM and OFDMA schemes, unless stated otherwise, will be referred to as an OFDMA scheme.

The OFDMA wireless communication system needs high-speed data transmission. For the high-speed data transmission, there is a need for high-order modulation schemes. Modulation schemes are divided into low-order modulation schemes such as Binary Phase Shift Keying (BPSK) and Quadrature Phase Shit Keying (QPSK), and high-order modulation schemes such as 16-ary Quadrature Amplitude Modulation (16 QAM) and 64 QAM. Performance of a transmission method based on the high-order modulation schemes greatly depends on channel conditions. That is, the transmission method can have a very high data rate in good channel conditions. However, in bad channel conditions, because many retransmissions are required, the use of the high-order modulation schemes, rather than the use of the low-order modulation schemes, may cause deterioration of the performance. Therefore, in the OFDMA wireless communication system, correctly detecting the channel conditions and using a modulation scheme appropriate for the detected channel conditions is important.

In a method for detecting the channel conditions by a transmitter of the wireless communication system, a receiver estimates a CINR for a particular signal transmitted from the transmitter and transmits the estimated CINR over a feedback channel, so the transmitter can detect the channel conditions. Here, the particular signal denotes a signal transmitted to a corresponding user. The transmitter may also determine a data rate using the information received over the feedback channel. The information received over the feedback channel has various usages. A description will now be made of a general method for estimating a CINR in the OFDMA wireless communication system.

FIG. 1 is a block diagram illustrating a structure of a terminal receiver with a CINR estimator in a general OFDMA system.

A signal received from an antenna ANT is applied to a radio frequency (RF) unit 110, and the RF unit 110 extracts a baseband analog signal from the received signal up-converted for transmission. The baseband analog signal output from the RF unit 110 is provided to an analog-to-digital converter (ADC) 120, and the ADC 120 converts the analog signal into a digital signal. The digital signal output from the ADC 120 is filtered by a filter 130 and then input to a Cyclic Prefix (CP) and serial-to-parallel (S/P) conversion unit 140. The CP and S/P conversion unit 140 removes a CP contaminated by multiple transmission paths, and converts the CP-removed serial digital signal into a parallel analog signal. The parallel signal undergoes Fast Fourier Transform (FFT) in an N-point (N-pt) FFT processor 150, so the time-domain input signal is converted into a frequency-domain signal. The frequency-domain signal is input to a signal synthesizer 170.

A pseudo-random noise (PN) code generator 160 for generating a unique PN code allocated to every user generates a unique PN code allocated to the receiver itself, and outputs the generated PN code to the signal synthesizer 170. The signal synthesizer 170 synthesizes the PN code uniquely allocated to the corresponding user with the frequency-domain signal, so the receiver can extract only the signal transmitted thereto. The signal extracted by the signal synthesizer 170 is divided into two signals, where one signal is input to a CINR estimator 180 and the other signal is input to a channel estimator 190. The CINR estimator 180 estimates a ratio of a desired signal in the received signal to an undesired noise component included in the received signal. The channel estimator 190 estimates a change in channel and channel conditions.

The CINR estimated in the receiver is transmitted to a transmitter over a feedback channel as described above. The transmitter determines a modulation order using the feedback information, modulates data in the determined modulation order, and transmits the modulated data to the receiver. Assuming that a terminal communicates with a base station #1, a signal obtained after CP removing in the receiver of FIG. 1 can be expressed as $$y[n] = h_1[n] \Theta_N s_1[n] + i[n] + w[n] \quad (1)$$

In Equation (1), $\Theta_N$ denotes N circular convolution, $h_1[n]$ denotes a time-domain channel response from the base station #1 to the terminal, $s_1[n]$ denotes a transmission signal from the base station #1, w[n] denotes an additive white Gaussian noise (AWGN), and i[n] denotes an interference signal from an adjacent cell. In addition, a signal obtained after N-pt FFT operation in the receiver of the terminal can be expressed as $$y(k) = H_l(k)s_l(k) + i(k) + w(k) \quad (2)$$

In Equation (2), l denotes an index of a base station, k denotes an index of a sub-carrier, $H_l(k)$ denotes an N-pint Discrete Fourier Transform (DFT) value of $h_l[n]$ and is a frequency-domain channel response characteristic. In addition, w(k) and i(k) denote N-point DFT coefficients of time-domain AWGN noises w(n) and i(n), respectively. Herein, the sum w(k)+i(k) of interferences and noises is modeled with white noises having power $$\frac{I_l}{N},$$

where $I_l$ denotes power of interference signals from base stations, except for the base station #1 in communication with the terminal, to the terminal. In the OFDMA wireless communication system, because signal transmission is performed through N sub-carriers, power of interference signals are also carried on the N sub-carriers, achieving 1/N scaling.

The notations used herein are defined as follows. An interference signal is expressed with a subscript l because it varies according to a reference base station, and an additive noise is expressed without any subscript because it is independent of the base station. Herein, [n] and (k) are used as factors for representing a pre-FFT signal, which is a time-domain signal, and a post-FFT signal, which is a frequency-domain signal, respectively. Assuming that $|s_l(k)|^2=1$, a CINR between the base station #1 and the terminal is defined as $$CINR_l = \frac{\sum_{k=0}^{N-1} E|H_l(k)|^2}{I_l} \quad (3)$$

Because $|s_l(k)|^2=1$, by multiplying y(k) by $s^*_l(k)$ in Equation (2), it is possible to obtain a signal $z_l(k)$ by removing the original signal $s_l(k)$ from Equation (2), as given below.

$$z_l(k) = H_l(k) + i_l(k) + w_l(k) \quad (4)$$

In Equation (4), $i_l(k)$ and $w_l(k)$ denote interference signals and additive noises, respectively, and are values given by multiplying a received signal y(k) by $s^*_l(k)$. In addition, because $|s_l(k)|^2=1$, power of $i_l(k)+w_l(k)$ is $$\frac{I_l}{N}.$$

Generally, CINR estimation is achieved by the CINR estimator 180 of FIG. 1 in cooperation with the channel estimator 190. In brief, the CINR estimator 180 obtains an estimated channel value $\hat{H}_l(k)$ from the channel estimator 190, estimates carrier power (or signal power) using the estimated channel value $\hat{H}_l(k)$ in accordance with Equation (5) below, and estimates power of the interferences and noises using the estimated carrier power in accordance with Equation (6) below.

$$\hat{C}_l = \sum_{k=o}^{N-1} |\hat{H}_l(k)|^2 \quad (5)$$

$$\hat{I}_l = \sum_{k=o}^{N-1} |z_l(k)|^2 - \hat{C}_l \quad (6)$$

Using Equation (5) and Equation (6), the final estimated CINR can be given as $$\hat{CINR}_l = \frac{\hat{C}_l}{\hat{I}_l} = \frac{\sum_{k=o}^{N-1} |\hat{H}_l(k)|^2}{\sum_{k=o}^{N-1} |z_l(k)|^2 - \sum_{k=o}^{N-1} |\hat{H}_l(k)|^2} \quad (7)$$

The method for estimating a CINR using an estimated channel value in accordance with Equation (7) greatly differs in CINR performance according to channel estimation performance. That is, accurate channel estimation increases the CINR performance, but inaccurate channel estimation decreases the CINR performance. Because the transmitter determines a modulation order depending on an estimated CINR fed back from the receiver, the inaccurate CINR estimation causes deterioration in the total system performance and unnecessary repetition of retransmission. In addition, because interference and noise power is involved in the process of calculating signal power (or carrier power) in accordance with Equation (4), a bias caused by the interference and noise power may occur in the calculated signal power. That is, the interference and noise power may be included in the signal power in the calculation process, making it difficult to calculate an accurate CINR.

Accordingly, there is a need for an improved apparatus and method for calculating an accurate CINR that increases transmission without deteriorating a system performance.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention to provide a terminal apparatus for increasing transmission efficiency in an OFDM/OFDMA wireless communication system, and a CINR estimation method therefor.

It is another aspect of the present invention to provide an apparatus and method for estimating an accurate CINR in an OFDM/OFDMA wireless communication system.

It is a further aspect of the present invention to provide an apparatus and method for reducing an error of a CINR in an OFDM/OFDMA wireless communication system.

According to one aspect of exemplary embodiments of the present invention, there is provided an apparatus for estimating a carrier-to-interference-and-noise ratio (CINR) of a received signal in an orthogonal frequency division multiplexing (OFDM) system, in which a band-pass filter attenuates a signal region of the received signal and passes a signal in a noise region, a first power calculator calculates interference and noise power of the noise-region signal received from the band-pass filter, a second power calculator calculates total received power of the received signal, and a ratio calculator calculates a CINR based on the interference and noise power and the total received power.

According to another aspect of exemplary embodiments the present invention, there is provided a method for estimating a carrier-to-interference-and-noise ratio (CINR) of a received signal in an orthogonal frequency division multiplexing (OFDM) system, in which a signal region of the received signal is attenuated and a signal in a noise region is band-passed, interference and noise power of the band-passed noise-region signal is calculated, and total received power of the received signal is calculated, and a CINR is calculated based on the interference and noise power and the total received power.

According to a further aspect of exemplary embodiments of the present invention, there is provided an apparatus for estimating a carrier-to-interference-and-noise ratio (CINR) of a received signal in an orthogonal frequency division multiplexing (OFDM) system, in which an inverse fast Fourier transform (IFFT) processor performs IFFT on the received signal, a window removes a signal region from an output signal of the IFFT processor and outputs a signal in a noise region, a first power calculator calculates interference and noise power of the noise-region signal received from the window, a second power calculator calculates total received power of the received signal, and a ratio calculator calculates a CINR based on the interference and noise power and the total received power.

According to yet another aspect of exemplary embodiments the present invention, there is provided a method for estimating a carrier-to-interference-and-noise ratio (CINR) of a received signal in an orthogonal frequency division multiplexing (OFDM) system, in which inverse fast Fourier transform (IFFT) is performed on the received signal, a signal region is removed from the IFFT-processed received signal and a signal in a noise region is extracted, using a window, interference and noise power of the noise-region signal received from the window is calculated, total received power of the received signal is calculated, and a CINR is calculated based on the interference and noise power and the total received power.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features and advantages of certain exemplary embodiments of the present invention will be more apparent from the following detailed description when taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

Figure 1:
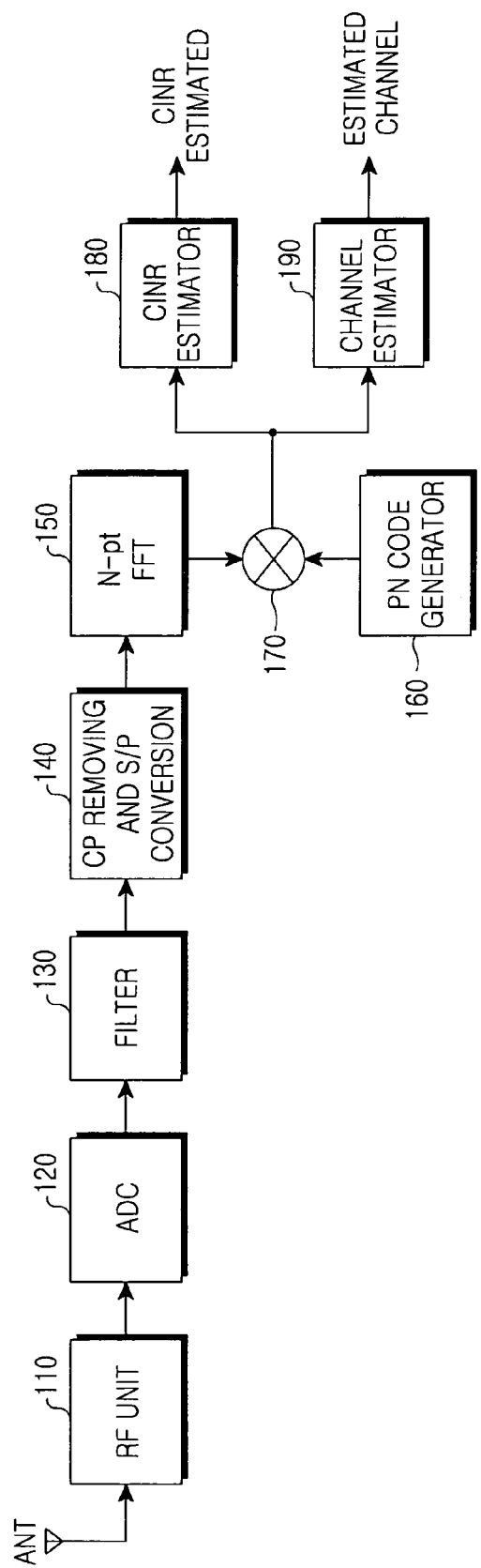
FIG. 1 is a block diagram illustrating a structure of a terminal receiver with a CINR estimator in a general OFDMA system.

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions are omitted for clarity and conciseness.

As described above, the conventional method for estimating a CINR using an estimated channel value has a large error in the estimated CINR. To make up for the defects, the present invention provides exemplary embodiments for a CINR estimation method. Exemplary embodiments of the present invention provides a method for estimating a CINR using Inverse Fast Fourier Transform (IFFT), and a method for estimating a CINR using a Finite Impulse Response (FIR) filter. In an exemplary implementation, a description will be made of a method for estimating a CINR with a channel estimator. In addition, a description will be made of simulation results on the CINR performance estimated according to an exemplary embodiment of the present invention.

The exemplary embodiments of the present invention estimate a CINR according to the following principle.

First, the CINR estimation method according to an exemplary embodiment of the present invention calculates estimated interference and noise power $\hat{I}_l$.

Second, the CINR estimation method calculates estimated signal power $\hat{C}_l$ (or carrier power) using the calculated estimated interference and noise power $\hat{I}_l$.

By estimating the CINR in this method, preventing the signal power from being biased to the interference and noise power is possible as described. In addition, the present invention accurately estimates signal power and noise power, thereby accurately estimating a CINR.

1. CINR Estimation Using IFFT

A time-domain signal of Equation (8) below is obtained by performing N-point Inverse Discrete Fourier Transform (IDFT), that is, IFFT, on $z_l(k)$ of Equation (4).

$$z_l[n]=h_l[n]+i_l[n]+w_l[n] \quad (8)$$

Because IDFT preserves signal power, $h_l[n]$ is signal power, and power of $i_l[n]+w_l[n]$ is interference and noise power $I_l$. In this instance, using the IFFT-processed signal of Equation (8), a CINR can be calculated by $$CINR_l = \frac{\sum_{n=o}^{N-1} |h_l[n]|^2}{\sum_{n=o}^{N-1} |i_l[n]+w_l[n]|^2} \quad (9)$$

However, because the OFDMA system is generally designed such that a channel length L is considerably less than the number N of sub-carriers (L<<N), Equation (8) can be rewritten as $$z_l[n] = \begin{cases} h_l[n] + i_l[n] + w_l[n] & \text{for } n = 0, 1, \ldots, L-1 \\ i_l[n] + w_l[n] & \text{for } n = L, L+1, \ldots, N-1 \end{cases} \quad (10)$$

In Equation (10), because a ratio of the channel length L to the number N of sub-carriers is set to a very small value of ⅛ or ¹⁄₁₆, the signal mainly includes a carrier component in a sample time interval of n=[0,L−1] and includes no signal component in a sample time interval of n=[L,N−1].

Figure 2:
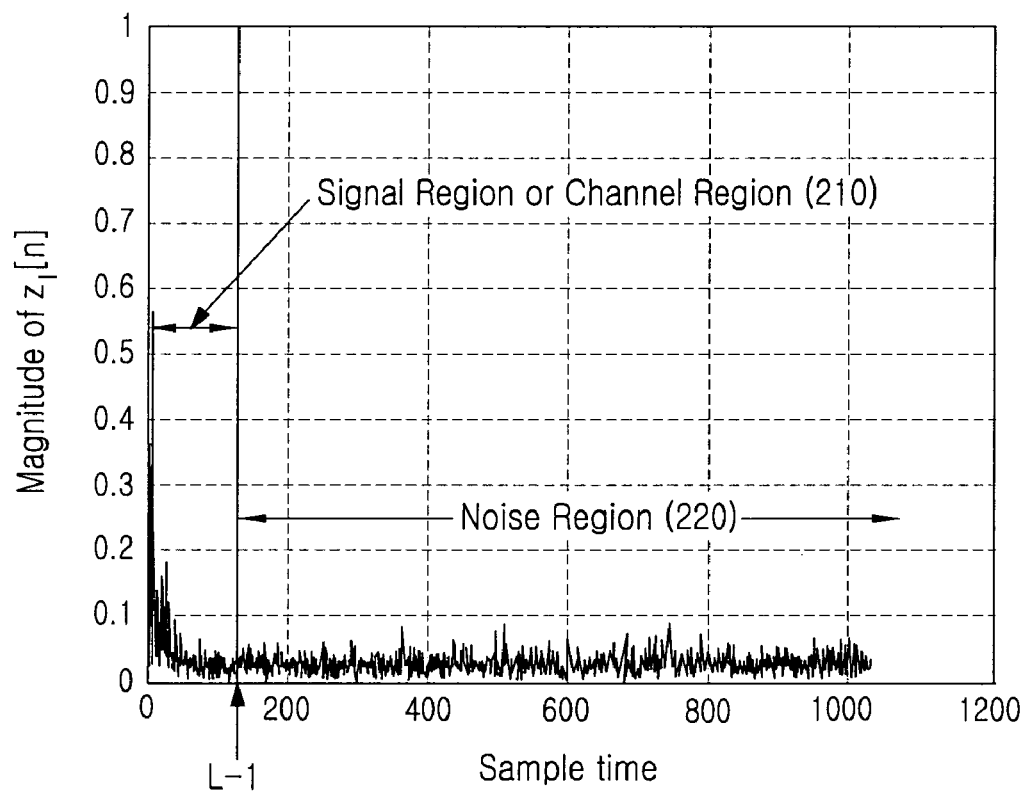
FIG. 2 is a diagram illustrating the simulation result on a signal region and a noise region when IDFT is performed.

With reference to FIG. 2, a description will now be made of a signal region and an interference and noise region (hereinafter referred to as a "noise region" for simplicity) in an IDFT-processed signal. FIG. 2 is a diagram illustrating a simulation result on a signal region 210 and a noise region 220 when IDFT is performed for N=1024 and L=128.

In FIG. 2, an IDFT-processed signal $z_l[n]$ is divided into a signal region 210 of [0,1, . . . , L−1] and a noise region 220 of [L,L+1, . . . , N−1] at a sample time. Therefore, a signal in the noise region 220 can be extracted by removing a sample time interval corresponding to the signal region 210 from the full sample time interval using a window. Accordingly, calculating power of the noise region 220 is possible.

Based on the calculated power of the noise region 220, estimating interference and noise power is possible over the full region including the signal region 210 of [0,1, . . . , L−1] and the noise region 220 of [L,L+1, . . . , N−1] in FIG. 2.

The interference and noise power over the full region, calculated in this manner, is calculated by $$\hat{I}_l = \sum_{n=0}^{N-1} |i_l[n] + w_l[n]|^2 \approx \frac{N}{N-L} \sum_{n=L}^{N-1} |z_l[n]|^2 \quad (11)$$

In addition, power of the signal region 210 can be calculated by subtracting the interference and noise power over the full region, as calculated using Equation (11), from the total received signal power in accordance with Equation (12) below.

$$\hat{C}_l = \sum_{n=0}^{N-1} |z_l[n]|^2 - \hat{I}_l \quad (12)$$

Therefore, the final estimated channel value can be calculated by $$\hat{CINR}_l = \frac{\hat{C}_l}{\hat{I}_l} = \frac{\sum_{n=0}^{N-1} |z_l[n]|^2 - \hat{I}_l}{\hat{I}_l} \quad (13)$$

Figure 3:
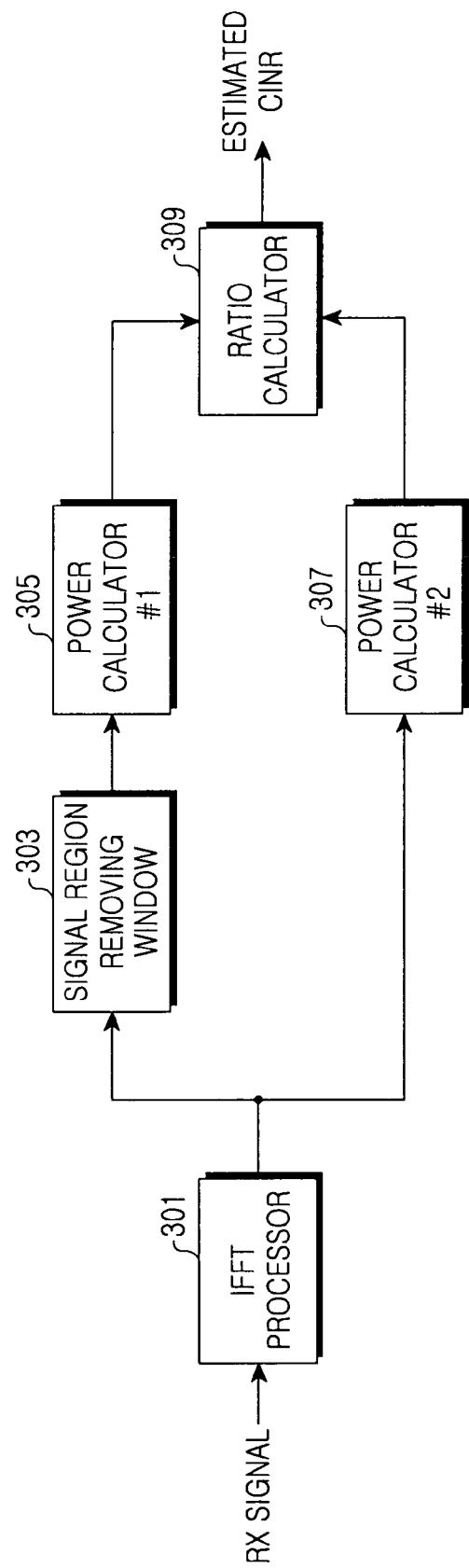
FIG. 3 is a block diagram illustrating a structure of a CINR estimation apparatus for estimating a CINR using an IFFT filter (or IFFT processor) according to an exemplary embodiment of the present invention.

FIG. 3 is a block diagram illustrating a CINR estimation apparatus for estimating a CINR using an IFFT filter (or IFFT processor) according to an exemplary embodiment of the present invention. With reference to FIG. 3, a detailed description will now be made of a structure and operation of the CINR estimation apparatus based on an IFFT filter according to an exemplary embodiment of the present invention.

Referring to FIG. 3, a received signal is provided from the signal synthesizer 170 of FIG. 1. The signal output from the signal synthesizer 170 is input to an IFFT processor 301, and the IFFT processor 301 performs IFFT on the input signal. An output signal of the IFFT processor 301 is divided into two same signals, where one signal is input to a first power calculator 305 via a signal region removing window 303 and the other signal is input to a second power calculator 307. The signal region removing window 303 is used to remove the signal region 210, or a sample time interval, of [0,1, . . . , L−1] described with reference to FIG. 2. As a result, the signal region removing window 303 outputs only the signal of the noise region 220 where the interference and noise signals exist. The output signal of the signal region removing window 303, from which the signal region 210 is removed, is input to the first power calculator 305. The first power calculator 305 calculates power of the signal output from the signal region removing window 303 and outputs the calculated power to a ratio calculator 309.

The second power calculator 307 calculates signal power over the full region. That is, the second power calculator 307 calculates power of all signals existing in the signal region 210 and the noise region 220 of FIG. 2, and outputs the calculated power to the ratio calculator 309. Then the ratio calculator 309 can calculate a CINR by subtracting the interference and noise power from the total received power in accordance with Equation (12) and Equation (13), because the ratio calculator 309 received the signal power of the noise region 220 where the interferences and noises exist, and the signal power over the full region. The CINR calculated by the ratio calculator 309 is used as an estimated CINR.

2. CINR Estimation Using Band-Pass Filters

The use of IFFT greatly increases hardware complexity and time delay. In order to make up for the defects, an exemplary embodiment of the present invention proposes an estimation apparatus for calculating a CINR using band-pass filters (BPFs). The estimation apparatus can remove an IFFT process for CINR or channel estimation, when processing a received signal in a frequency domain. That is, the band-pass filters calculate energy by passing $z_l(k)$ through an ideal band-pass filter F(k) having a band of [128-1023] (for N=1024) in accordance with Equation (4), thereby calculating power of a noise region. In addition, the band-pass filters can obtain signal power by calculating power of the filters using an ideal band-pass filter A(k) having a pass band of [0-127]. Accordingly, the exemplary embodiments may obtain a CINR in the same principle. The use of the ideal band-pass filter, compared with the use of the IFFT, increases the calculation. However, the use of properly approximated M-tap FIR filters as band-pass filters can reduce the calculation. Assuming that F(k) denotes an M-tap FIR band-pass filter including a channel signal region as a stop band and a noise region as a pass band, because a channel component is removed by the filter, an output of the FIR band-pass filter can be approximated by $$v_l(k) = \sum_{m=0}^{M} F(m)z_l((k-m)_N) \approx \sum_{m=0}^{M} F(m)(i_l((k-m)_N) + w_l((k-m)_N)) \quad (14)$$

Power of the $v_l(k)$ calculated in Equation (14) is given as $$E[|v_l(k)|^2] = E\left[\sum_{m=0}^{M} |F(m)(i_l((k-m)_N) + w_l((k-m)_N)|^2)\right] \quad (15)$$

$$= \sum_{m=0}^{M} |F(m)|^2 (E[|i_l((k-m)_N)|^2] + E[|w_l((k-m)_N)|^2])$$

$$= I_l \sum_{m=0}^{M} |F(m)|^2$$

In conclusion, Equation (15) means that interference and noise power can be estimated through estimation of output power of the filter. That is, from Equation (14) and Equation (15), the estimated interference and noise power is calculated by $$\hat{I}_l = \frac{\sum_{m=0}^{N-1} |v_l(m)|^2}{\sum_{m=0}^{M} |F(m)|^2} \quad (16)$$

After the estimated interference and noise power is calculated in accordance with Equation (16), a CINR can be finally calculated using Equation (13). In the process of calculating the CINR, because the calculation of Equation (16) is considerable, using P samples through proper scaling of Equation (17) below is possible instead of using all $v_l(k)$, in order to reduce the calculation.

$$\hat{I}_l = \frac{\frac{P}{N}\sum_{p=0}^{P-1} |v_l(m_p)|^2}{\sum_{m=0}^{M} |F(m)|^2} \quad (17)$$

Figure 4:
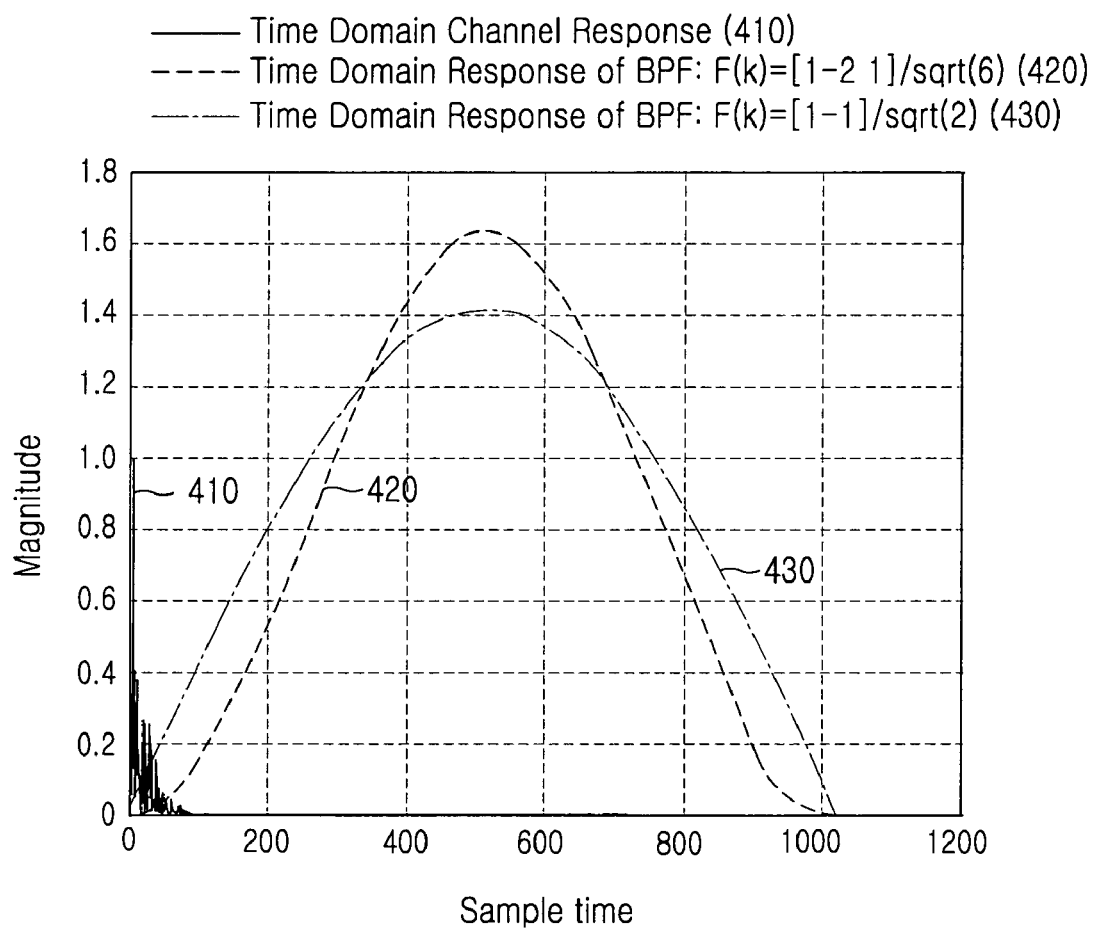
FIG. 4 is a diagram illustrating the simulation result on time-domain response characteristics of two possible types of band-pass filters according to an exemplary embodiment of the present invention.

FIG. 4 is a diagram illustrating the simulation result on time-domain response characteristics of two possible types of band-pass filters according to an exemplary embodiment of the present invention.

Referring to FIG. 4, reference numeral 430 denotes a time-domain response characteristic curve for a first band-pass filter with one tap. The one-tap band-pass filter can be expressed as $$\frac{1}{\sqrt{2}}[1, -1].$$

Therefore, for the one-tap band-pass filter, $$F(0) = \frac{1}{\sqrt{2}}, F(1) = \frac{-1}{\sqrt{2}}$$

and $|F(0)|^2+|F(1)|^2=1$.

For a description of the time-domain response characteristic for the first band-pass filter, a flat channel will be taken into consideration. In the flat channel, a channel response characteristic is $H_l(k)=a$ and is constant for k. Therefore, based on the channel response characteristic, Equation (4) can be rewritten as $$z_l(k)=a+i_l(k)+w_l(k) \quad (18)$$

In this case, if Equation (18) is calculated using the one-tap filter with a coefficient of $$\frac{1}{\sqrt{2}}[1, -1],$$

an output of the filter is calculated by $$v(k) = \frac{1}{\sqrt{2}}(z_1(k) - z_1(k-1)) \quad (19)$$
$$= \frac{1}{\sqrt{2}}(i_1(k) + w_1(k) - i_1(k-1) - w_1(k-1))$$

Through the calculation of Equation (19), the filter output includes only the sum of interferences and noises, with the signal component (or carrier component), that is, the channel component, completely removed. In an exemplary implementation, $$\frac{1}{\sqrt{2}}$$

denotes a normalization value given taking the power of the filter into account.

Next, reference numeral 420 denotes a time-domain response characteristic curve for a second band-pass filter with 2 taps. The two-tap band-pass filter can be expressed as $$\frac{1}{\sqrt{6}}[1, -2, 1].$$

Therefore, $$F(0) = \frac{1}{\sqrt{6}},$$
$$F(1) = -\frac{2}{\sqrt{6}},$$

and $$F(2) = \frac{1}{\sqrt{6}}.$$

Even for the 2-tap filter, $$\frac{1}{\sqrt{6}}$$

denotes a normalization value given, taking the power of the filter into account. The filter-based calculation can be achieved in accordance with Equation (18) and Equation (19). In addition, an increase in the number of taps of FIG. 4 contributes to improvement of the response characteristics of the band-pass filters. However, the increase in the number of taps increases the calculation. Therefore, designing the filters with an appropriate number of filters is preferable, taking into account the response characteristic and calculation of the band-pass filters.

Figure 5:
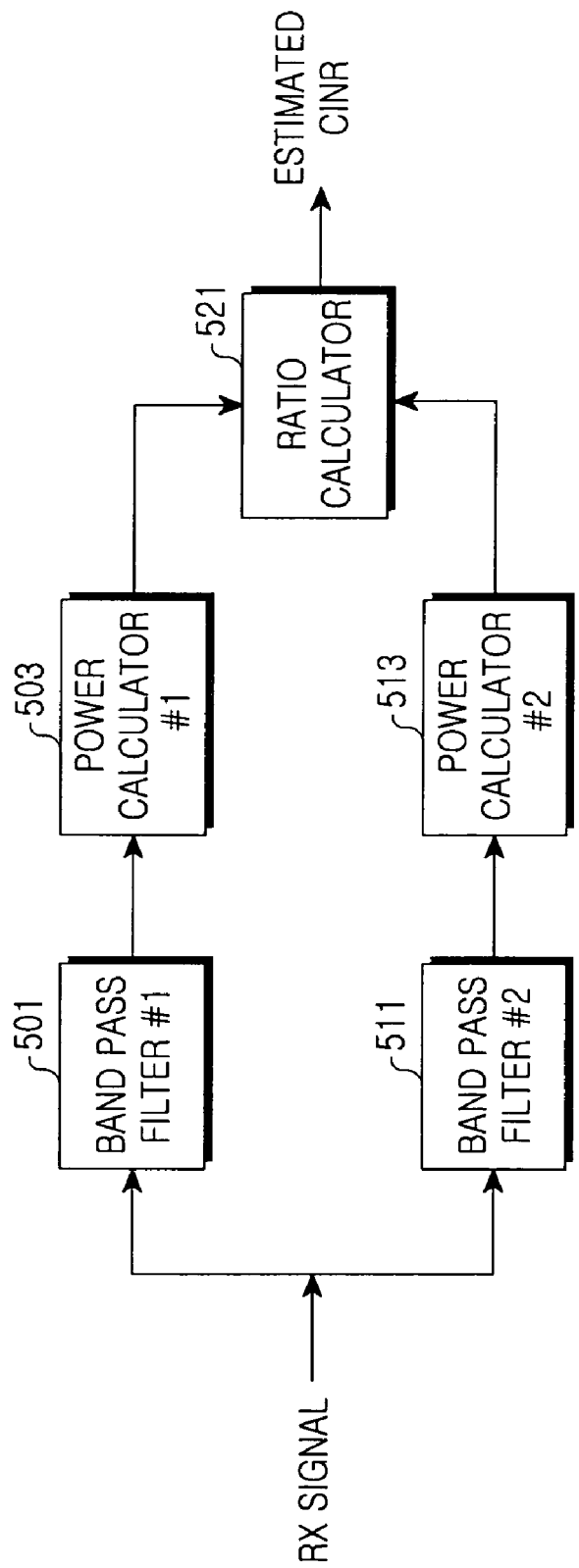
FIG. 5 is a block diagram illustrating an apparatus for estimating a CINR using FIR filters according to an exemplary embodiment of the present invention.

FIG. 5 is a block diagram illustrating an apparatus for estimating a CINR using FIR filters according to an exemplary embodiment of the present invention. With reference to FIG. 5, a description will now be made of a structure and operation of the apparatus for estimating a CINR using FIR filters according to an exemplary embodiment of the present invention.

Referring to FIG. 5, a received signal is provided from the signal synthesizer 170 of FIG. 3. The received signal is divided into two same signals, where one signal of which is input to a first band-pass filter 501. The first band-pass filter 501 may include an M-tap FIR filter described above. That is, the first band-pass filter 501 is a filter F(k) for extracting interference and noise signals. Therefore, the signal output from the first band-pass filter 501 includes only the interference and noise signals from which the signal component is excluded. The signal output from the first band-pass filter 501 is input to a first power calculator 503, and the first power calculator 503 calculates power of the interference and noise signals.

Of the two divided signals, the other signal is input to a second band-pass filter 511, and the second band-pass filter 511 extracts only the signal in the signal region of [0-127] and outputs the extracted signal to a second power calculator 513. Then the second power calculator 513 calculates power of the signal region.

The power calculated by the first power calculator 503 and the second power calculator 513 is provided to a ratio calculator 521. The ratio calculator 521 calculates a ratio of the power of the signal component to the power of the interference and noise components, and outputs the calculated ratio as an estimated CINR.

Further, constructing the CINR estimation apparatus of FIG. 5 in the form of FIG. 3 is possible without including the second band-pass filter 511 in FIG. 2. In this instance, the second power calculator 513 calculates the total received power and outputs the calculated total received power to the ratio calculator 521. Then the ratio calculator 521 can calculate a CINR by subtracting the interference and noise power received from the first power calculator 503 from the total received power provided from the second power calculator 513, in accordance with Equation (12) and Equation (13). The CINR calculated by the ratio calculator 521 is used as an estimated CINR according to an exemplary embodiment of the present invention.

3. Coupling between Channel Estimator and Proposed CINR Estimator

A description will now be made of a method for coupling the channel estimator for the proposed CINR estimator.

The IFFT-based CINR estimation method and the FIR filter-based CINR estimation method can be efficiently implemented in association with the channel estimator. The existing IFFT-based channel estimator can obtain an estimated time-domain channel response $h_l[n]$ from a signal region $[0, L-1]$ of $z_l[n]$. The IFFT-based estimator can also obtain an estimated frequency-domain channel value $\hat{H}_l(k)$ by performing FFT on the time-domain channel response $h_l[n]$. Because the proposed CINR estimator first calculates power of a region $[L, N-1]$ from $z_l[n]$, almost no additional hardware is required for implementation of the CINR estimator, if the $z_l[n]$ obtained in the course of IFFT-based channel estimation is used. A description thereof will now be made.

FIR filter-based CINR estimation can be efficiently implemented by using the filter needed in the channel estimator. This is because the second band-pass filter 511 is an FIR filter for extracting the components of the signal region as described with reference to FIG. 5. That is, the FIR filter for extracting the components of the signal region can also be used as a filter for channel estimation. This is possible because the FIR filter uses a low pass filter having a signal region as a pass band to extract the components of the signal region. Therefore, using the filter for channel estimation for estimation of a CINR is possible by appropriately modulating low pass filter coefficients used for the channel estimator instead of using a separate FIR band-pass filter.

A detailed description will now be made of a method for using one filter for both channel estimation and CINR estimation.

The second band-pass filter 511 of FIG. 5 is a filter A(k) for extracting signal components, and has a pass band of $[0, L-1]$, assuming that the second band-pass filter 511 is an M-tap FIR filter used for the channel estimator.

If the M-tap FIR filter coefficient undergoes $$e^{-j\frac{2\pi}{N}kn_0}$$

modulation, the coefficient becomes a new filter coefficient $$F(k) = e^{-j\frac{2\pi}{N}kn_0}A(k),$$

and creating the F(k) as a filter having a noise region as a pass band is possible by properly selecting $n_0$. Frequency domain modulation shifts a pass band of the F(k) to a time domain, shifting the pass band to $[n_0, n_0+L]$. Therefore, for $n_0 > L$, the pass band of the F(k) falls within the noise region. In this instance, additional multiplication is needed to perform modulation on the F(k), so the calculation is still considerable. However, if a particular time delay, for example, $n_0 = N/2$ or $N/4$, is selected, $$e^{-j\frac{2\pi}{N}kn_0} = e^{-j\pi k}$$

or $$e^{-j\frac{\pi}{2}k}$$

and can be expressed as elements of $\{1, -1, -j, j\}$. As a result, a simple change in sign can replace the multiplication.

As one example of the signs of arrows shown by dotted lines (1,-1,1,-1), if the low pass filter response A(k) is shifted to N/2 of the time domain, the A(k) can be expressed as B(k) in the frequency domain as the Equation below:

$$B(k) = A(k) * \exp(j*N/2*2*pi/N*k) = A(k)e^{-j\pi k} \text{ for } k=0,1, 2, \ldots, Ntap.$$

Herein, the values calculated by the Equation are respectively as follows:

$$B(0) = A(0)e^{-j\pi 0} = A(0)*1 = A(0),$$

$$B(1) = A(1)e^{-j\pi 1} = A(1)*-1 = -A(1),$$

$$B(2) = A(2)e^{-j\pi 2} = A(2)*1 = A(2)$$

$$B(3) = A(3)e^{-j\pi 3} = A(3)*-1 = -A(3)$$

$$B(4) = A(4)e^{-j\pi 4} = A(4)*1 = A(4)$$

$$B(5) = A(5)e^{-j\pi 5} = A(5)*-1 = -A(5)$$

$$B(6) = A(6)e^{-j\pi 6} = A(6)*1 = A(6)$$

Accordingly, B(k) can be calculated by periodically applying (1,-1,1,-1) to A(k), that is, that B(k) can be calculated from A(k) without multiplying the B(k) only with a simple change in sign of the A(k).

As another example, if the low pass filter response A(k) is shifted to N/4 of the time domain, B(k) can be expressed in the frequency domain as the Equation below:

$$B(k) = A(k)*\exp(j*N/4*2*pi/N*k) = A(k)e^{-j\frac{\pi}{2}k}$$

for $k = 0, 1, 2, \ldots, N$ tap

Herein, the values calculated by the Equation are respectively as follows:

$$B(0) = A(0)e^{-j\frac{\pi}{2}0} = A(0)*1 = A(0)$$

$$B(1) = A(1)e^{-j\frac{\pi}{2}1} = A(1)*-j = -j*A(1)$$

$$B(2) = A(2)e^{-j\frac{\pi}{2}2} = A(2)*-1 = -A(2)$$

$$B(3) = A(3)e^{-j\frac{\pi}{2}3} = A(3)*j = j*A(3)$$

$$B(4) = A(4)e^{-j\frac{\pi}{2}4} = A(4)*1 = A(4)$$

$$B(5) = A(5)e^{-j\frac{\pi}{2}5} = A(5)*-j = -j*A(5)$$

$$B(6) = A(6)e^{-j\frac{\pi}{2}6} = A(6)*-1 = -A(6)$$

Accordingly, B(k) can be calculated by periodically applying (1,−j,1,−j) to A(k), that is, that B(k) can be calculated from A(k) without multiplying the B(k) only with a simple change in sign of the A(k).

Figure 6:
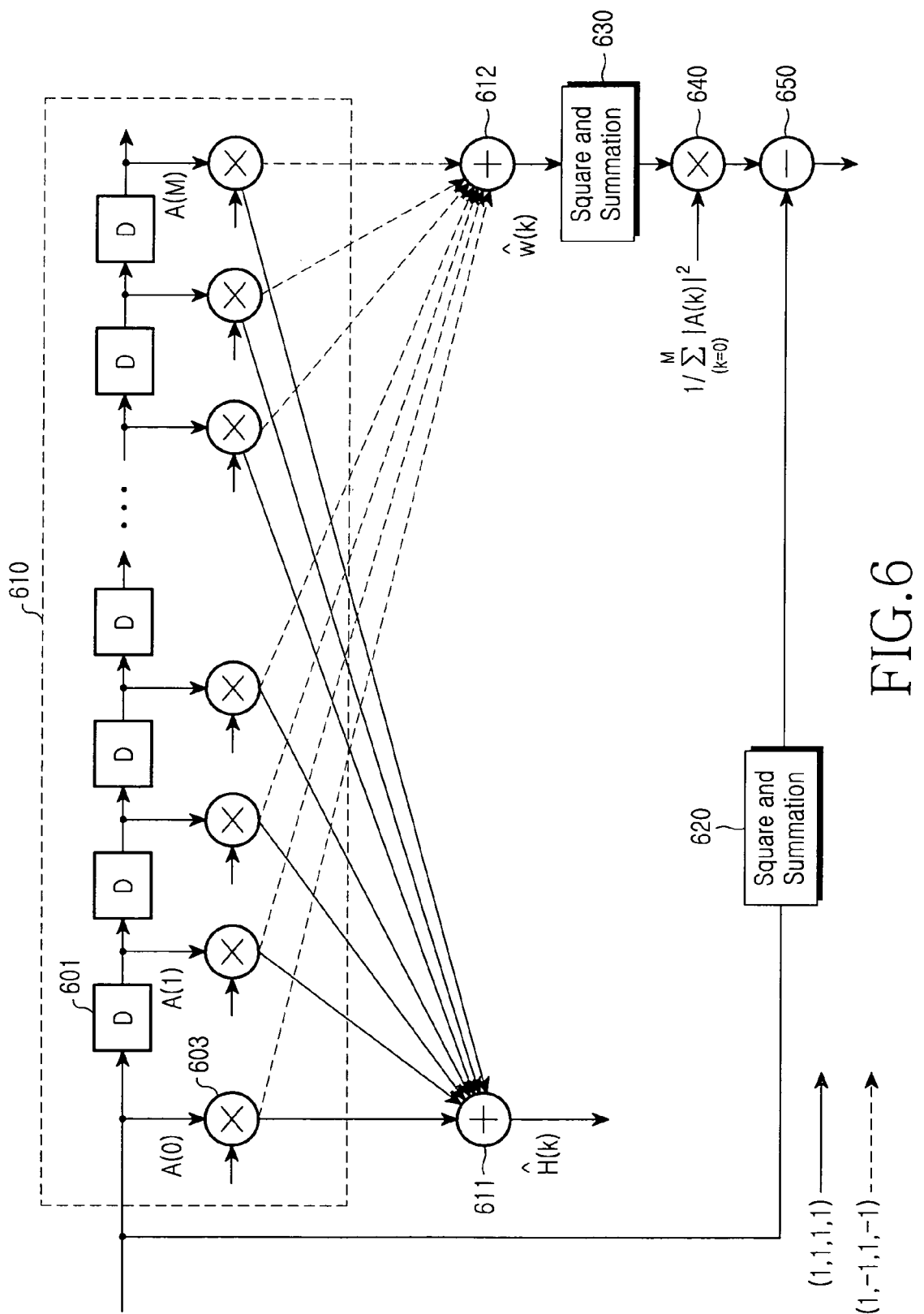
FIG. 6 is a circuit diagram for implementing an M-tap FIR filter according to an exemplary embodiment of the present invention.

FIG. 6 is a circuit diagram for implementing an M-tap FIR filter according to an exemplary embodiment of the present invention. Referring to FIG. 6, a signal input to the FIR filter is provided from the signal synthesizer 170 of FIG. 1. The input signal is applied to an operator 610 including M delays 601 and (M+1) multipliers 603, where the input signal undergoes delay and multiplication. In the operator 610, signs of arrows shown by solid lines are (1,1,1,1), and signs of arrows shown by dotted lines are (1,−1,1,−1). The solid-line arrows output from the operator 610 are summed up in a first adder 611, outputting an estimated frequency-domain channel value Ĥ(k). The dotted-line arrows output from the operator 610 are summed up in a second adder 612, outputting an estimated frequency-domain AWGN Ŵ(k).

First and second power calculators 620 and 630 both calculate power in the same way. The power calculation includes squaring and summation, and is expressed as $$\sum_{n=0}^{1023}|x[n]|^2.$$

The first power calculator 620 calculates total received power of a received signal, and the second power calculator 630 calculates power of an interference and noise signal. However, for the interference and noise signal, compensating for the variation in power due to the filter is necessary in accordance with Equation (17).

Therefore, the interference and noise power calculated by the second power calculator 630 is input to a scaling processor 640. The scaling processor 640 performs scaling by multiplying the output of the second power calculator 630 by $$\frac{1}{\sum_{k=0}^{M}|A(k)|^2}$$

in order to compensate for the variation in power due to the filter. Accordingly, the scaling processor 640 calculates a final estimated interference and noise power. Because signal power is determined by subtracting interference and noise power from received power, a subtractor 650 can calculate power of the signal component by subtracting the interference and noise power from the received power.

Figure 7:
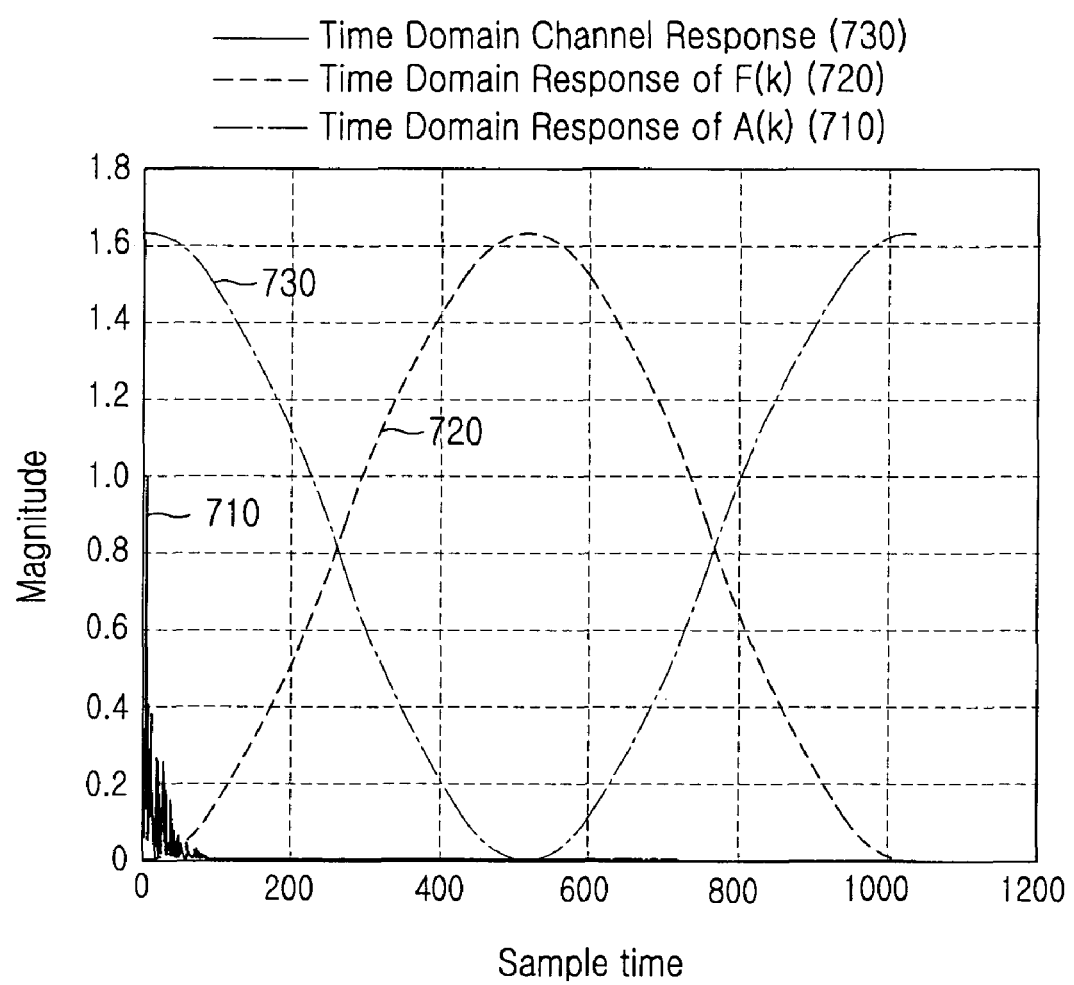
FIG. 7 is a graph illustrating the simulation result on response characteristics of filters where a channel estimator operates in association with a CINR estimator according to an exemplary embodiment of the present invention.

FIG. 7 is a graph illustrating the simulation result on response characteristics of filters in the case where a channel estimator operates in association with a CINR estimator according to an exemplary embodiment of the present invention.

In the graph of FIG. 7, reference numeral 720 denotes a time-domain response characteristic of the first band-pass filter 501 of FIG. 5, reference numeral 710 denotes a time-domain response characteristic of the second band-pass filter 511, and reference numeral 730 denotes a time-domain channel response characteristic.

For M=2, the second band-pass filter A(k) 511 for passing the signal region has low pass filter taps of $$\frac{1}{\sqrt{6}}[1, 2, 1].$$

Therefore, $$A(0) = \frac{1}{\sqrt{6}},$$

$$A(1) = \frac{2}{\sqrt{6}}$$

and $$A(2) = \frac{1}{\sqrt{6}}.$$

If $n_0$=N/2, the same band-pass filter as the second filter can be obtained. That is, obtaining a band-pass filter is possible, given as $$F(k) = e^{-j\pi k}A(k):\frac{1}{\sqrt{6}}[1, -2, 1], \quad (20)$$

$$F(0) = \frac{1}{\sqrt{6}},$$

$$F(1) = -\frac{2}{\sqrt{6}},$$

$$F(2) = \frac{1}{\sqrt{6}}$$

Implementation thereof will now be described in detail.

The channel estimator can be expressed as Equation (21) below, and an output of the first band-pass filter 501 for extracting the interference and noise components can be expressed as Equation (22) below.

$$\hat{H}_I(k) = A(0)z_I(k) + A(1)z_I((k-1)_N) + A(2)z_I((k-2)_N) \quad (21)$$

$$v_I(k) = A(0)z_I(k) - A(1)z_I((k-1)_N) + A(2)z_I((k-2)_N) \quad (22)$$

For channel estimation, the channel estimator performs three multiplications of A(0)$z_I$(k), A(1)$z_I$(k−1) and A(2)$z_I$(k−2) to calculate Ĥ(k). However, the interference and noise signal $v_I$(k) output from the first band-pass filter 501 includes the sum of and difference between A(0)$z_I$(k), A(1)$z_I$(k−1) and A(2)$z_I$(k−2). Therefore, simply obtaining an estimated CINR is possible with the addition and subtraction without additional multiplication. That is, obtaining a CINR with the filter of FIG. 6 is possible.

Figure 8:
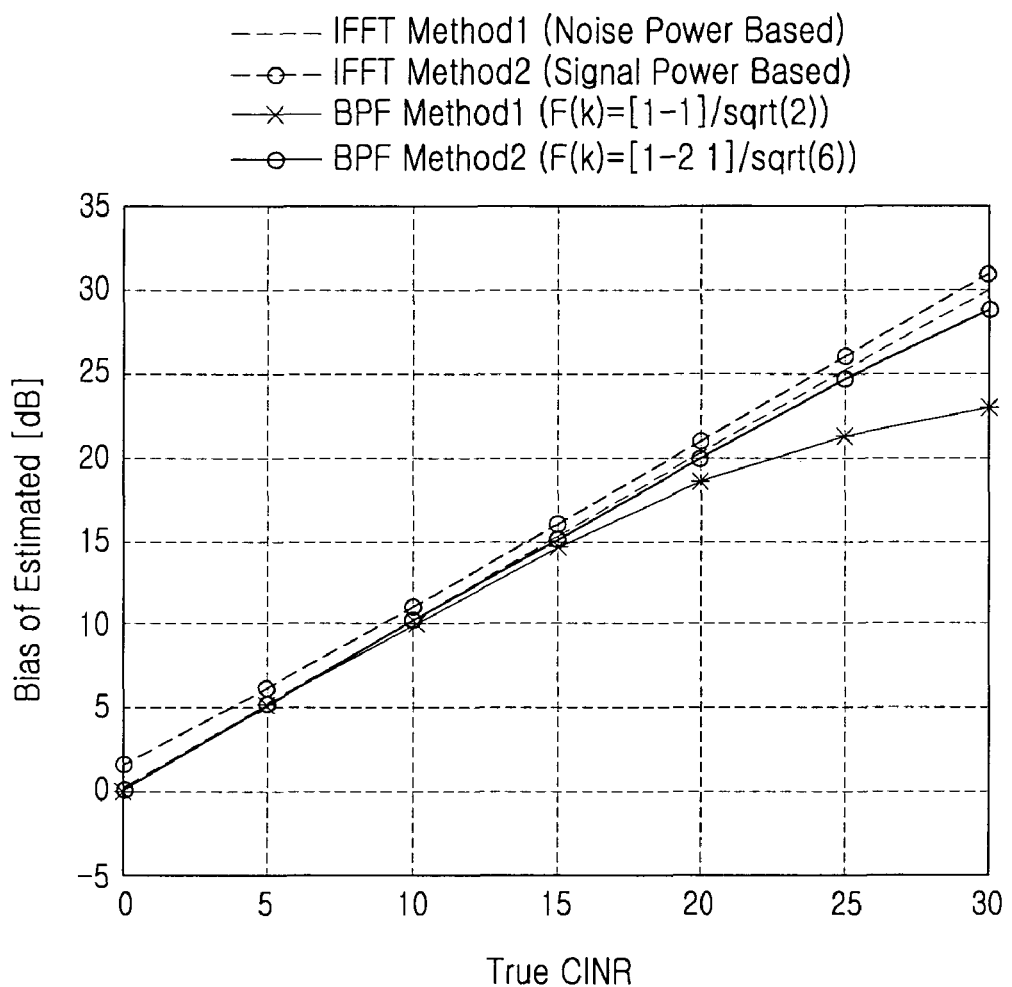
FIGS. 8 and 9 are graphs illustrating the simulation results on CINR estimation performance for an IFFT-based CINR estimator and an FIR filter-based CINR estimator according to an exemplary embodiment of the present invention.
Figure 9:
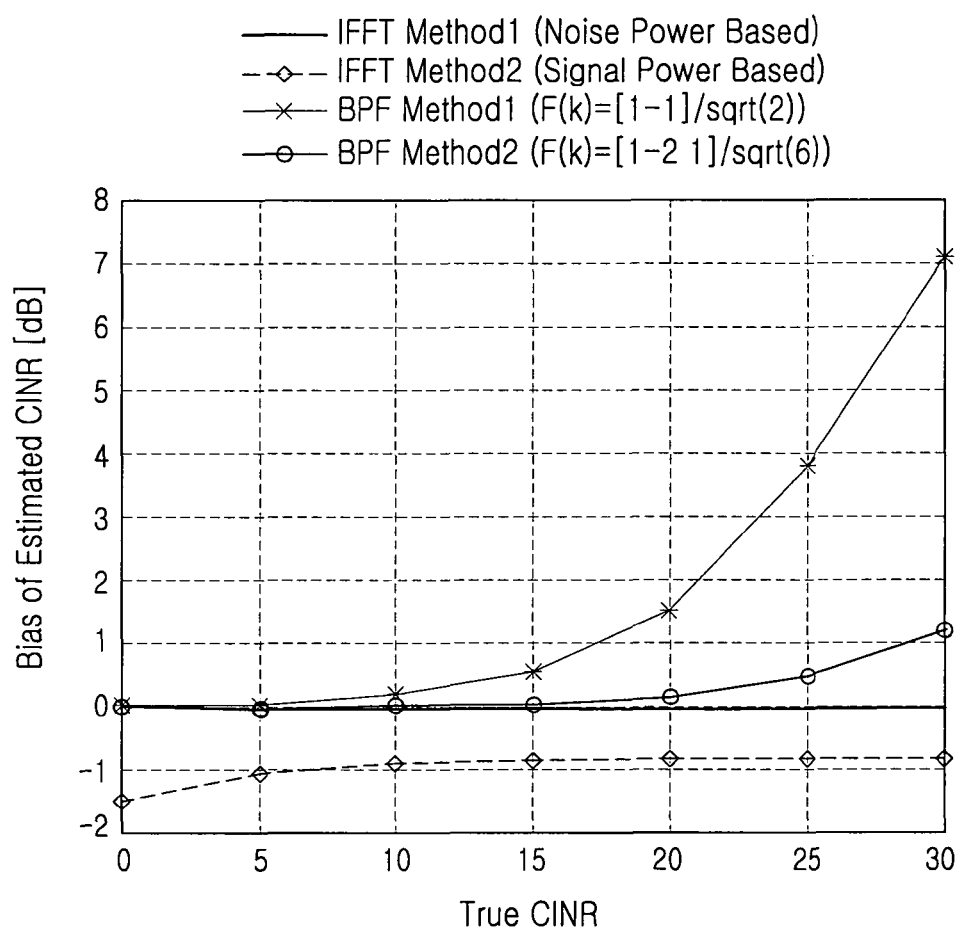

4. Performance Comparison between IFFT-Based CINR Estimator and FIR Filter-Based CINR Estimator FIGS. 8 and 9 are graphs illustrating the simulation results on CINR estimation performance for an IFFT-based CINR estimator and an FIR filter-based CINR estimator according to an exemplary embodiment of the present invention. For example, FIG. 8 illustrates CINR estimation performance for the IFFT-based CINR estimator, and FIG. 9 illustrates CINR estimation performance for the FIR filter-based CINR estimator.

The simulation environment is provided in FIGS. 8 and 9 such that N=1024 and a channel profile reduces power in the ratio of exp(−0.1n). Each graph in FIGS. 8 and 9 was obtained through 100 repeated simulations. In FIGS. 8 and 9, the signal region-based CINR estimator suffers from the bias, but the noise region-based CINR estimator can estimate a CINR without the bias. In the band-pass filter-based CINR estimation, the 2-tap filter in an exemplary embodiment is superior in estimation performance to the 1-tap filter. This is because the pass band for estimating a CINR using IFFT according to an exemplary embodiment of the present invention includes the channel region as well as the noise region, so the estimated CINR is higher than the actual CINR. As a result, the final estimated CINR is lower than the actual CINR. However, estimating a CINR using BPFs according to an exemplary embodiment of the present invention is narrower in terms of the channel region included in the pass band. Therefore, overestimation is reduced of a CINR when using IFFT due to the channel region, thereby obtaining an estimated CINR approximating the actual CINR.

As can be understood from the foregoing description, exemplary embodiments of the present invention estimates an accurate CINR by reducing an error of a CINR in an OFDMA wireless communication system, thereby contributing to improvement of the system efficiency.

While the invention has been shown and described with reference to a certain exemplary embodiments thereof, it will be understood by those skilled in the art that various changes in form and details may be made therein without departing from the spirit and scope of the invention as defined by the appended claims.

What is claimed is:

1. An apparatus for estimating a carrier-to-interference-and-noise ratio (CINR) of a received signal in an orthogonal frequency division multiplexing (OFDM) system, the apparatus comprising:
   a band-pass filter for attenuating a signal region signal in a signal region of the received signal and passing a noise region signal in a noise region of the received signal;
   a first power calculator for calculating an interference and noise power of the noise region signal received from the band-pass filter;
   a second power calculator for calculating total received power of the received signal;
   a scaling processor for compensating for the interference and noise power due to the band-pass filter; and
   a ratio calculator for calculating a CINR based on the interference and noise power and the total received power,
   wherein the band-pass filter comprises a finite impulse response (FIR) filter, wherein the FIR filter serves as a filter for a channel estimator, and the band-pass filter is designed by defining a predetermined delay interval in the FIR filter, and
   wherein the first power calculator calculates the interference and noise power over a full region of the received signal, the full region including the signal region and the noise region.

2. The apparatus of claim 1, wherein the ratio calculator calculates signal power by calculating a difference between the total received power and the interference and noise power.

3. An apparatus for estimating a carrier-to-interference-and-noise ratio (CINR) of a received signal in an orthogonal frequency division multiplexing (OFDM) system, the apparatus comprising:
   a first band-pass filter for attenuating a signal region signal in a signal region of the received signal and passing a noise region signal in a noise region of the received signal;
   a second band-pass filter for attenuating the noise region signal of the received signal and passing the signal region signal;
   a first power calculator for calculating an interference and a noise power of the noise region signal received from the first band-pass filter;
   a second power calculator for calculating a signal power of the signal region signal received from the second band-pass filter;
   a scaling processor for compensating for the interference and the noise power of the received power by the second band-pass filter; and
   a ratio calculator for calculating a CINR based on the compensated interference and noise power and the signal power,
   wherein each of the first and second band-pass filters comprises a finite impulse response (FIR) filter, and wherein the first band-pass filter is designed by defining a predetermined delay interval in the FIR filter, and
   wherein the first power calculator calculates the interference and noise power of the noise region signal over a full region of the received signal, the full region including the signal region and the noise region.

4. A method for estimating a carrier-to-interference-and-noise ratio (CINR) of a received signal in an orthogonal frequency division multiplexing (OFDM) system, the method comprising:
   attenuating a signal region signal in a signal region of the received signal and band-passing a noise region signal in a noise region of the received signal;
   calculating an interference and noise power of the band-passed noise-region signal, and calculating total received power of the received signal;
   compensating for the interference and noise power of received power by the band-pass filter; and
   calculating a CINR based on the interference and noise power, and the total received power,
   wherein the band-passing is performed by a finite impulse response (FIR) filter, wherein the FIR filter serves as a filter for a channel estimator, and wherein, in the band-passing, a predetermined delay is defined in the FIR filter, and
   wherein the interference and noise power is calculated over a full region of the received signal, the full region including the signal region and the noise region.

5. The method of claim 4, wherein the calculating of the CINR comprises:
   calculating signal power by calculating a difference between the total received power, and the interference and noise power; and
   calculating a ratio of the signal power to the interference and noise power.

6. A method for estimating a carrier-to-interference-and-noise ratio (CINR) of a received signal in an orthogonal frequency division multiplexing (OFDM) system, the method comprising:

attenuating, at a first band-pass filter, a signal region signal in signal region of the received signal and passing a noise region signal in a noise region of the received signal;

attenuating, at a second band-pass filter, the noise region and passing the signal region signal;

calculating an interference and noise power of the noise-region signal received from the first band-pass filter;

calculating signal power of the signal-region signal received from the second band-pass filter;

compensating for the interference and noise power of received power by the second band-pass filter; and calculating a CINR based on the interference and noise power, and the signal power, wherein each of the first and second band-pass filters comprises a finite impulse response (FIR) filter, and wherein the first band-pass filter is designed by defining a predetermined delay interval in the FIR filter, and wherein the interference and noise power is calculated over a full region of the received signal, the full region including the signal region and the noise region.

* * * * *